United States Patent [19]

Evans et al.

[11] Patent Number: 4,866,728
[45] Date of Patent: Sep. 12, 1989

[54] ELECTRIC DISCHARGE APPARATUS

[75] Inventors: David R. Evans; John E. Harry, both of Loughborough, England

[73] Assignee: JECO2 Lasers, Inc., Saddle Brook, N.J.

[21] Appl. No.: 166,381

[22] Filed: Feb. 4, 1988

Related U.S. Application Data

[63] Continuation-in-part of Ser. No. 2,031, Jan. 12, 1987, abandoned, which is a continuation of Ser. No. 684,555, Dec. 21, 1984, abandoned.

[51] Int. Cl.⁴ .............................................. H01S 3/097
[52] U.S. Cl. ........................................ 372/88; 372/58; 372/87
[58] Field of Search ............................... 372/82, 88, 58

[56] References Cited

U.S. PATENT DOCUMENTS 3,970,962 7/1976 Peressini et al. ...................... 372/74

FOREIGN PATENT DOCUMENTS 9048425 3/1982 European Pat. Off. ............... 372/58
0125883 10/1981 Japan ................................... 372/58

OTHER PUBLICATIONS

Seguin et al.; "Crossed-Tube Fluid-Ballasted Electrode Pair For EDL Applications", Appl. Optics vol. 20, No. 3, Jul. 1, 1981.

Primary Examiner—Leon Scott, Jr.
Attorney, Agent, or Firm—Kane, Dalsimer, Sullivan, Kurucz, Levy, Eisele & Richard

[57] ABSTRACT

A gas laser includes a laser cavity, mirror means defining an optical path in the cavity, electrodes defining an electric discharge path in the cavity, the electrodes including at least one anode member having a passage therethrough which at one end opens into the cavity, and gas supply means for injecting gas into the cavity through the passage, wherein the wall of the passage at said one end and the exterior of the anode member around the end of said passage is electrically insulated and an electrically conducting anode surface defining the root of the discharge is provided inwardly of the perimeter of the open end of the passage.

17 Claims, 5 Drawing Sheets

ELECTRIC DISCHARGE APPARATUS

RELATED APPLICATIONS

This application is a continuation-in-part of Ser. No. 002,031 filed Jan. 12, 1987, now abandoned which in turn is a continuation of Ser. No. 864,555 filed Dec. 21, 1984 now abandoned.

BACKGROUND OF THE INVENTION

This invention relates to anode members in electric discharge apparatus generally and in gas lasers in particular.

It is usual for the anodes and cathodes of electric discharge apparatus to be non-porous, but it has also been proposed to provide an apertured electrode in certain kinds of electric discharge apparatus, for example plasma torches, to facilitate cooling of the electrode; a cool stream of gas is passed through the interior of the electrode and emerges through its surface.

One of the objects commonly applicable in the design of a gas laser is that of achieving with reliability ability the maximum power output from a given physical size of laser. Another consideration is the efficiency of the laser.

In a typical high power gas laser, a reflective and partially reflective mirror define an optical path within the laser cavity. A glow discharge is generated in the laser cavity between electrodes to provide plasma in the cavity and the gas is circulated around a closed path which incorporates the laser cavity. The glow discharge that is generated may be approximately aligned with the optical axis in the cavity as in an axial flow laser or it may be transverse to the optical axis as in a transverse-discharge laser. Furthermore, the discharge may be generated from an alternating voltage source or from a pulsed direct voltage source to provide an intermittent discharge as in a pulsed laser or the discharge may be generated from a direct voltage source to provide a continuous laser output. One limitation of the power output that can be obtained in a laser arises from the fact that as the discharge current is increased so there is a tendency for a glow discharge to change to an arc (glow to arc transition). One region where such a transition is likely to occur is the anode region and it is therefore desirable to provide a gas laser in which the possibility of glow to arc transition occurring in the anode region is reduced.

In the February 1970 issue of the IEEE Journal of Quantum Electronics a transverse-discharge gas laser is described in which discharges are generated between a plurality of anodes and cathodes, the discharges extending perpendicular to the optical axis of the laser. The discharges generated between respective electrodes are spaced apart from one another sufficiently to prevent coalescing of the discharges. In order to improve the laser gain gas is injected through the anodes which are in the form of open ended tubes. We have found that with an arrangement of this kind, a discharge from an anode seats on an exterior edge of the tube and is therefore outside the flow of gas through the tube.

It is an object of the invention to provide a gas laser having at least one anode member and which is able to provide a high output power for a given size of laser, with the anode member arranged so as to inhibit the generation of arcs in the anode region.

SUMMARY OF THE INVENTION

The present invention provides a gas laser including a laser cavity, mirror means defining an optical path in the cavity, electrodes defining an electric discharge path in the cavity, the electrodes including at least one anode member having a passage therethrough which at one end opens into the cavity, and gas supply means for injecting gas into the cavity through the passage, wherein the wall of the passage at said one end and the exterior of the anode member around the end of said passage is electrically insulated and an electrically conducting anode surface defining the root of the discharge is provided inwardly of the perimeter of the open of the passage.

To maximise the effect of the injected gas it is injected through the anode member itself. In this case the effect of the injected gas on the discharge is very much enhanced. It has been found that a surprisingly large power increase can be obtained in a gas laser using such as arrangement.

In a first form of the invention the electrically conducting anode surface is provided across the passage, the surface being perforated to allow gas to pass therethrough. In one example to be described later, the substitution of a perforated anode for a conventional electrode together with the provision of a suitable gas flow through the anode members enabled the power of the laser to be increased from 170 Watts to 1070 Watts.

Preferably the whole electrically conducting anode surface is perforated. In this case the advantage of porosity is provided for the whole of the operative part of the anode. By "electrically conducting anode surface" is meant that part of the anode member which is exposed and which is electrically conducting and therefore provides a potential starting point for an electric discharge.

Preferably the electrically conducting anode surface is devoid of any edges, substantial bends or curvature and most preferably is flat. Furthermore the surface is preferably in a plane substantially perpendicular to the discharge path therefrom in the immediate region of the anode member. Both of these features assist in promoting a uniform high volume discharge.

Preferably the anode member is a tubular member, which may be of circular cross-section, projecting into the cavity, the exterior of the portion of the tubular member projecting into the chamber being electrically insulated and having an electrically conducting end wall in the laser cavity that is perforated. The end wall is preferably recessed within the tubular member. The gas supply means may be connected to the other end of the tubular member and an electrical connection made to the electrically conducting end wall.

The gas introduced through the anode may be at a temperature closer to room temperature than to the temperature of the gas in the chamber; preferably the gas introduced is at or below room temperature.

The pressure of gas in the chamber is preferably in the range of 0.4 to 13 kPa and most preferably in the range of 0.7 to 6 kPa.

In a second form of the invention the electrically conducting anode surface is preferably defined by the interior surface of the wall of the passage. In this case there need be no obstruction in the passage so that gas flow along the passage is not impeded. An alternative arrangement, however, involves mounting a rod electrode coaxially within the passage; in such a case the electrode may be provided at the front end of the passage and may even project forward beyond the end of the passage. In the last mentioned arrangement the anode surface is located inwardly in a radial direction of the perimeter of the open end of the passage whereas in the previously described arrangements the anode surface is located inwardly in an axial direction of the perimeter of the open end of the passage. Both kinds of arrangement are within the scope of the present invention.

The electrically conducting anode surface is preferably defined by the interior surface of the wall of the gas flow passage. The anode member is preferably of generally tubular form and the anode surface may be defined by the interior surface of the tubular wall of the member.

Preferably the electrically conducting anode surface extends in a direction generally aligned with the gas flow. In such a case, since the root of the discharge must extend perpendicularly from the anode surface, the discharge will initially extend transverse to the gas flow and thus be subjected to the full effect of the gas flow.

The exact shaping of the open end portion of the passage is not a subject of the present invention. It may be advantageous for the passage to narrow immediately downstream of the anode surface and this narrowing may be provided by a step in the passage which may be defined by one end of an electrically insulating sleeve located inside the end portion of the passage. It may also be advantageous to shape the passage so as to provide supersonic flow in the region of the anode surface.

The distance of the anode surface from the downstream end of the passage may be at least 5 mm and in an embodiment of the invention to be described is 20 mm. Such an arrangement provides a substantial length of discharge confined within the passage ensuring that the gas flow has a full effect on the discharge.

In both the first and second forms of the invention, a plurality of anode members are preferably provided, each having a passage through which gas is injected into the cavity by the gas supply means. The provision of a plurality of anode members promotes the creation of a uniform high volume discharge and increases the total discharge current that can be employed.

The open ends of the passages in the anode members are preferably arranged to lie in a common plane perpendicular to the axis of the optical path in the laser cavity and preferably equiangularly spaced around a central axis of the laser cavity.

While it is possible to provide a common cathode member for all the anode members, it is preferable to provide a plurality of cathode members although one cathode member may be associated with more than one anode member or vice versa. This provides better control of the cathode roots of the discharges and improves utilisation of the cavity in the cathode region.

The invention is particularly applicable to a laser in which the optical path in the laser cavity is substantially aligned with the electrical discharge path defined by the electrodes. Nonetheless the invention may be used in a transverse-discharge laser.

The laser may be a $CO_2$ gas laser.

The invention may be applied to a laser having a pulsed laser output or one having a continuous laser output and is of particular advantage in the latter case. It should be understood however that where reference is made to a laser having a continuous output that should not be taken to imply that the output is sustained for a prolonged period of time. Each pulse of a pulsed output is likely to last only for a very small fraction of a second whereas a "continuous" output could be expected to last for a second or longer.

The present invention also provides a method of operating a gas laser including a laser cavity and electrodes defining an electric discharge path in the cavity, the electrodes including at least one anode member having a passage therethrough which at one end opens into the cavity, wherein gas is injected into the cavity through the passage and a discharge extends from an electrically conducting anode surface inwardly of the perimeter of the open end of the passage, said one end and the exterior of the anode member around the end of said passage being electrically insulated from the anode surface.

BRIEF DESCRIPTION OF THE DRAWINGS

By way of example, embodiments of the invention will now be described with reference to the accompanying drawings, of which.

DETAILED DESCRIPTION OF THE INVENTION

Figure 1:
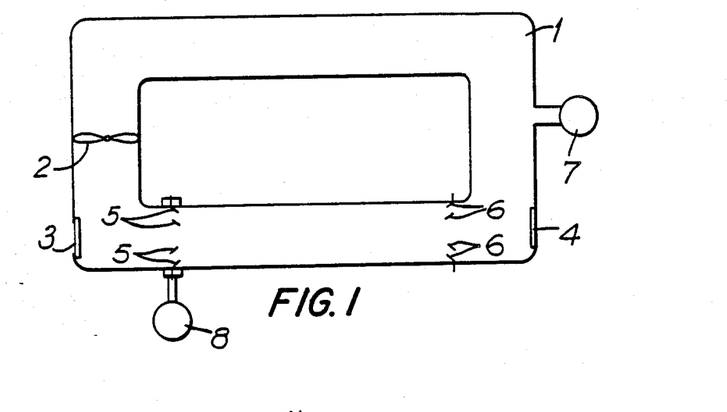
FIG. 1 is a schematic sectional plan view of a a first form of laser.

Referring first to FIG. 1, there is shown a gas laser having an annular duct of circular cross-section defining a gas circulation path, a fan 2 for circulating gas around the path, a front mirror/window 3, a rear mirror 4 and an electric discharge arrangement comprising six anode members 5 and six cathode members 6 (four anode members and four cathode members being visible in FIG. 1) located in the duct 1 between the mirrors 3 and 4. Each of the anode members is associated with a respective cathode member axially aligned therewith and the anodes and cathodes are connected in an electrical circuit which may be of the kind described in British Patent Application No. 2095490A or British Patent No. 2095491, the disclosures of which are incorporated herein by reference, and which will not be described further here. The duct 1 is connected to a vacuum pump 7 to maintain the pressure in the duct at a selected value in the range of 0.7 kPa to 6 kPa, and the anode members 5 are connected to a gas supply means 8 as will be described more fully below.

Figure 2:
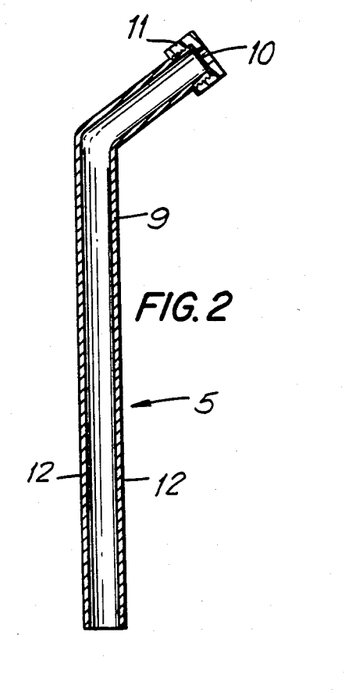
FIG. 2 is an enlarged sectional side view of an anode of the laser shown in FIG. 1.

The structures of the six anode members 5 are all identical and one is shown in FIG. 2. Each anode member is made from a length of copper tubing 9 of circular cross-section which is bent towards one end and over the bent end of which an electrode in the form of a fine mesh metal filter 10 is located, being secured in place by a screw threaded cap 11 made of insulating material which locates the filter in a recessed position at the end of the anode member. The exterior of the tubing 9 is insulated, in this example, by a layer 12 of $Al_2O_3$ sprayed onto the exterior of the tubing 9.

The anode members 5 are equiangularly spaced around the duct 1 with the bent portions of the anode members parallel with the axis of the duct and with the tips of the members lying in a common plane perpendicular to the axis of the duct. Thus the electrically conducting anode surface of each anode member is defined by the area of the filter 10 not covered by the cap 11 and it will be seen that this surface is approximately perpendicular to the axis of the duct.

The stem portion of the tubing 9 of each electrode passes through the wall of the duct 1 and terminates just outside the duct, enabling the open end of the tubing to be connected to the gas supply means 8.

In operation electrical connections are made to the anode and cathode members, electric glow discharges are generated between each anode/cathode pair and gas is passed down each anode member and passes through the filter 10 into the duct 1 which in this region forms part of the laser cavity. It is found that by passing gas through the anode members the power of the laser can be increased substantially.

In one particular example of the embodiment of FIGS. 1 and 2 each of the anode members had a bent portion of 30 mm length and a stem portion of 100 mm length, the diameter of the exposed area of filter 10 which was made of stainless steel was 5 mm, the filter had holes of diameter 0.005 ins (about 0.13 mm) spaced apart from one another by 0.010 ins (about 0.25 mm) in a hexagonal array, and the separation of the cathode and anode members (the active or excited length of the laser) was 0.5 m. The gas which circulated in the duct 1 was a mixture by volume of 4.5% $CO_2$, 13.5% $N_2$, 82% He and was circulated at a rate of 2250 l s$^{-1}$ with the pressure in the duct at 1.3 kPa. Without supplying gas through the anode members the power output obtained from the laser was 170 W but when the same mixture of gas as was circulating in the duct 1 was passed from a supply through the anode members at a temperature of about 15 degrees C., at a rate of 1.8 l s$^{-1}$ and at a pressure of 350 kPa per anode member, the power output increased to 1050 W. When the fan 2 was turned off a power output of 840 W was achieved with a gas flow of 1.8 l/s at 350 kPa at each anode member.

Figure 3:
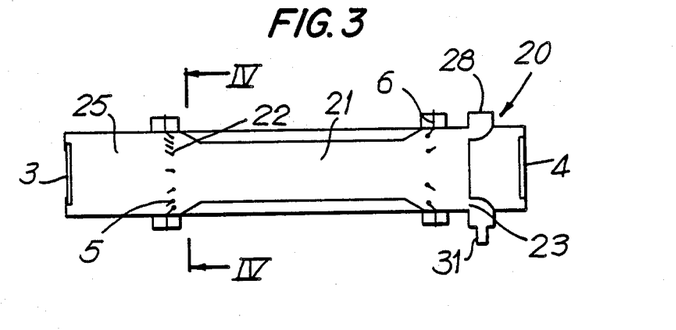
FIG. 3 is a schematic sectional plan view of a laser head of a second form of laser embodying the invention.
Figure 4:
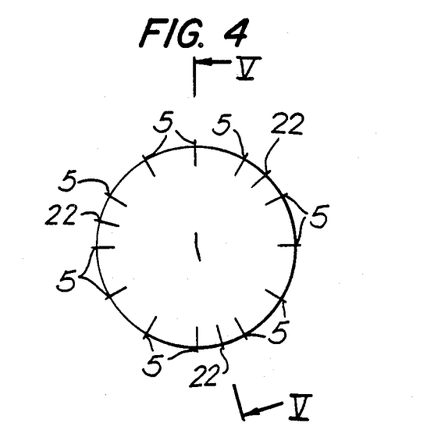
FIG. 4 is a diagrammatic view along the lines IV—IV of FIG. 3.
Figure 5:
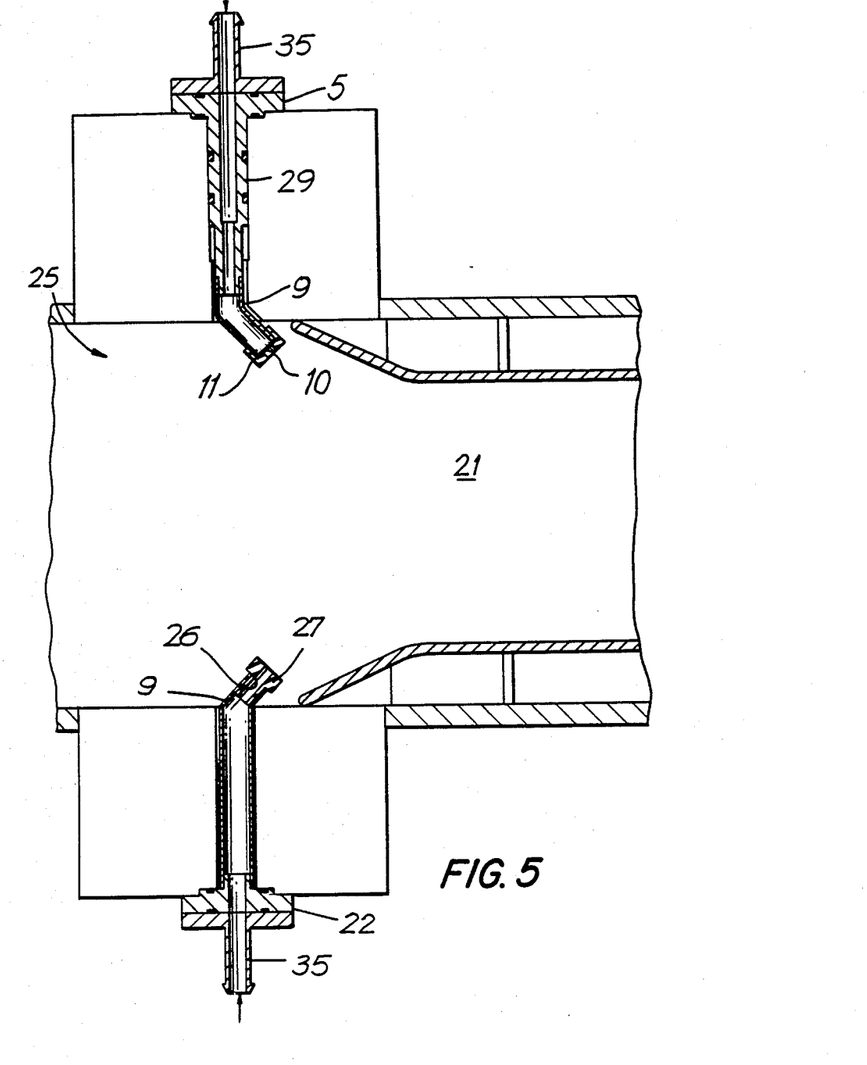
FIG. 5 is a sectional view along the lines V—V of FIG. 4.

Referring now to FIGS. 3 to 5, there is shown a laser head 20 without an endless duct 1. In FIGS. 3 to 5 parts corresponding to those shown in FIGS. 1 and 2 are designated by the same reference numerals.

The laser head 20 has a chamber 25 defining a laser cavity 21 of circular cross-section, a front mirror/window 3, a rear mirror 4, an electric discharge arrangement comprising a set of anode members 5 and a set of cathode members 6, a set of gas inlets 22 associated with the anodes 5, and a gas outlet 23. Twelve anode members 5 are provided equiangularly spaced around the cavity 21 and three gas inlets 22 are provided also equiangularly spaced around the cavity 21, each gas inlet 22 being located midway between adjacent anode members 5. FIG. 4 shows purely diagrammatically the positioning of the anode members 5 and the gas inlets 22. Six cathode members 6 are provided equiangularly spaced around the cavity 21 and each of the anode and cathode members is connected through a respective ballasting impedance (not shown) to a power supply (not shown in FIGS. 3 to 5) so that stable coalescing electric discharges may be generated between the anodes and cathodes as disclosed in more detail in British Patent Application No. 2095490A or British patent No. 2095491.

Referring now particularly to FIG. 5, the structure of each of the anode members 5 is similar, but not identical to, that described above with reference to FIG. 2 being made from a length of copper tubing 9 secured to a brass component 29 of circular cross-section having an axial passageway therethrough. The tubing 9 is of circular cross-section and has a bent end over which a fine mesh element 10 is located, being held in place by a screw threaded cap 11 made of insulating material which locates the filter in a recessed position at the end of the anode member. The exterior of the tubing 9, which projects into the chamber 25, is insulated by a layer of insulating material sprayed onto the exterior of the tubing 9.

The optical path of the laser corresponds to the diameter of the laser cavity 21 along its central region between the mirrors 3, 4 and the whole of the cross-sectional area of the cavity is employed. The anode members 5 and cathode members 6, while they project into the chamber 25, do not intrude into the laser cavity 21 and the optical path between the mirrors 3, 4 as the diameter of the chamber 25 is enlarged in the region of the anode members 5 and cathode members 6. The tips of the anode members 5 are inclined to the longitudinal axis of the laser so that discharges extend inwardly from the anode members and therefore reach the central axis of the cavity at a position close to the anode members so that the laser gain on the central axis is maintained for a greater part of the length of the laser cavity and there is only a small conical volume of short axial length extending from the anode members where the gain is significantly reduced.

The structure of each gas inlet 22 is the same and an example of one such inlet is shown in FIG. 5. It will be seen that the inlet is in similar form to the anode member 5 shown in FIG. 2 except that no fine mesh element 10 is provided and of course no electrical connection is made to the inlet. The inlet 22 is made from a length of copper tubing 9 of circular cross-section which is bent towards one end and on the bent end of which a cap 27 made of insulating material is mounted, the cap having an inner sleeve 26 which extends down the interior of the copper tubing 9. As with each anode member 5, that part of the tubing 9 that projects into the chamber 25 is insulated, either by a layer of insulating material sprayed onto the exterior of the tubing 9 or by a plastic coating heat shrunk onto the tubing 9. The insulation of the inlets 22 avoids them providing an earth connection for discharges from the anode members 5.

The cathode members 6 are also located in a part of the chamber 25 that is of enlarged diameter and consequently they do not intrude into the laser cavity 21. The gas outlet 23 is provided on the opposite side of the cathode members 6 to the anode members 5 and is an annular outlet around the whole of the cavity 21. The annular outlet is defined by a manifold 28 which has an outlet 31 for connection to a gas recirculating system as will be described more fully below with reference to FIG. 5.

Figure 6:
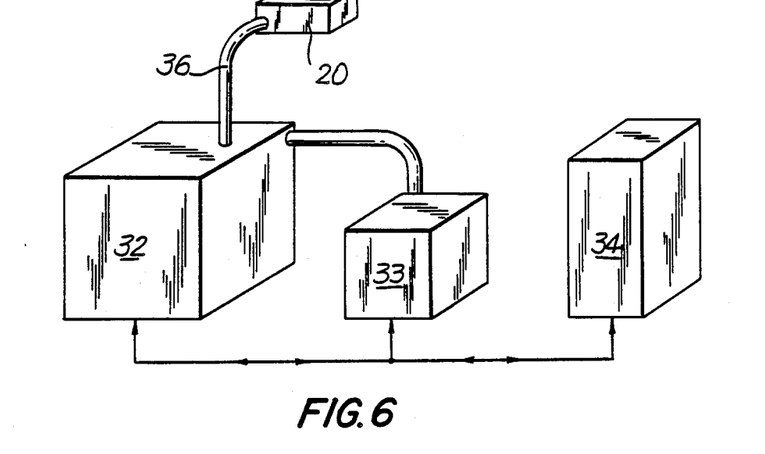
FIG. 6 is a block diagram showing the overall arrangement of a laser incorporating the laser head of FIGS. 3 to 5.

FIG. 6 shows schematically how the laser head 20 of FIGS. 3 to 5 is connected to other important component parts of the laser, namely a gas recirculating system 32, a power supply system 33 and a control cubicle 34. Each of the anode and cathode members is provided with a flexible electrical connection to the power supply system 33 which includes the respective stabilizing impedances for each electrode referred to above. The electrical connections pass via the gas recirculating system 32 through an umbilical cord 36 to the laser head 20. Each of the anode members 5 is also connected via a flexible conduit to a gas outlet of the gas recirculating system 32 and similarly each of the gas inlets 22 is connected via a flexible conduit to a gas outlet of the system 32. The flexible conduits also pass through the umbilical cord 36 and are connected to connecting portions 35 of the anode members 5 and inlets 22. The anode members and gas inlets may share one or more flexible conduits. Finally, the outlet 31 of the manifold 28 is connected to the inlet of the gas recirculating system 32 via one or more flexible conduits in the umbilical cord 36. The details of the construction of the gas recirculating system is not a part of the present invention and will not be described further here. The system may be constructed from conventional components including for example a heat exchanger, vacuum pump, compressor, filter and gas reconstitutor in a manner that will be understood without further explanation by those skilled in the art.

The operation of the gas recirculating system and the power supply is controlled from the control cubicle 34.

In operation, electric glow discharges are generated between the anodes and cathodes and gas is injected into the laser cavity through each of the inlets 22 and each of the anode members 5, and removed from the laser cavity through the outlet 8.

In one particular example of the embodiment of FIGS. 3 to 6 the diameter of the central part of the laser cavity 21 was 93 mm and this was also the diameter of the laser beam (prior to any focussing), the diameter of the enlarged portions of the chamber 25 was 136 mm, the internal diameter of each of the gas inlets 22 was 5 mm, the diameter of the exposed part (effective surface) of the fine mesh element 10 of each anode member was 6.5 mm, the mesh element 10 had a thickness of 0.127 mm, a hole size of 0.152 mm, a centre-to-centre hole spacing of 0.279 mm and the holes were arranged in a hexagonal array. The cathode members were solid copper cathodes each with a surface area of 6000 mm$^2$. The spacing of the anode members from the cathode members was 0.6 m.

In operation with a stabilizing impedance of 10 k$\Omega$ connected to each cathode and a stabilizing impedance of 30 k$\Omega$ connected to each anode and with a discharge voltage of 9 kV, a total discharge current of 1.6 A was obtained giving a total discharge power of 14.5kW. A gas mixture comprising, by volume, 82% He, 13.5% $N_2$ and 4.5% $CO_2$ was injected through the anode members 5 and gas inlets 22. The total flow rate through the anode members was 125 std m$^3$/hr and the same total flow rate was injected through the inlets 22 giving a total flow rate of 250 std m$^3$/hr. The pressure in the laser cavity was maintained at 4.65 kPa. With such an arrangement a power output of 3 kW at a wavelength of 10.6 $\mu$m was obtained. Thus the specific laser output was 740 W/liter, the output power per meter of discharge was 5 kW/m and the efficiency of the laser was about 20 percent.

In the case of the arrangement described above the overall dimensions of the laser head may be 1000 mm × 400 mm × 400 mm, and may have a weight of 100 kg. Thus the laser head may be fairly easily manoeuvred and can be mounted on a robot arm if desired. The gas recirculating system 32 may be in a module the overall dimensions of which are 3000 mm × 2000 mm × 1600 mm, the power supply system may be in a module the overall dimensions of which are 900 mm × 1200 mm × 1300 mm, and the control cubicle may have overall dimesions of 2200 mm × 1000 mm × 1000 mm. While these modules are of course interconnected they can be designed and manufactured separately from one another, which makes the manufacture of the laser relatively straightforward and inexpensive.

Figure 7:
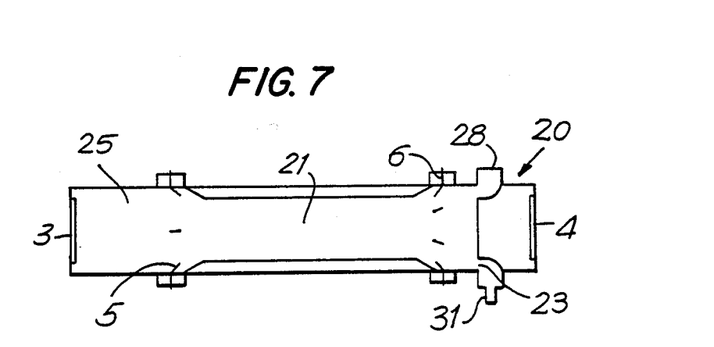
FIG. 7 is a schematic sectional plan view of a laser head of a third form of laser embodying the invention.
Figure 8:
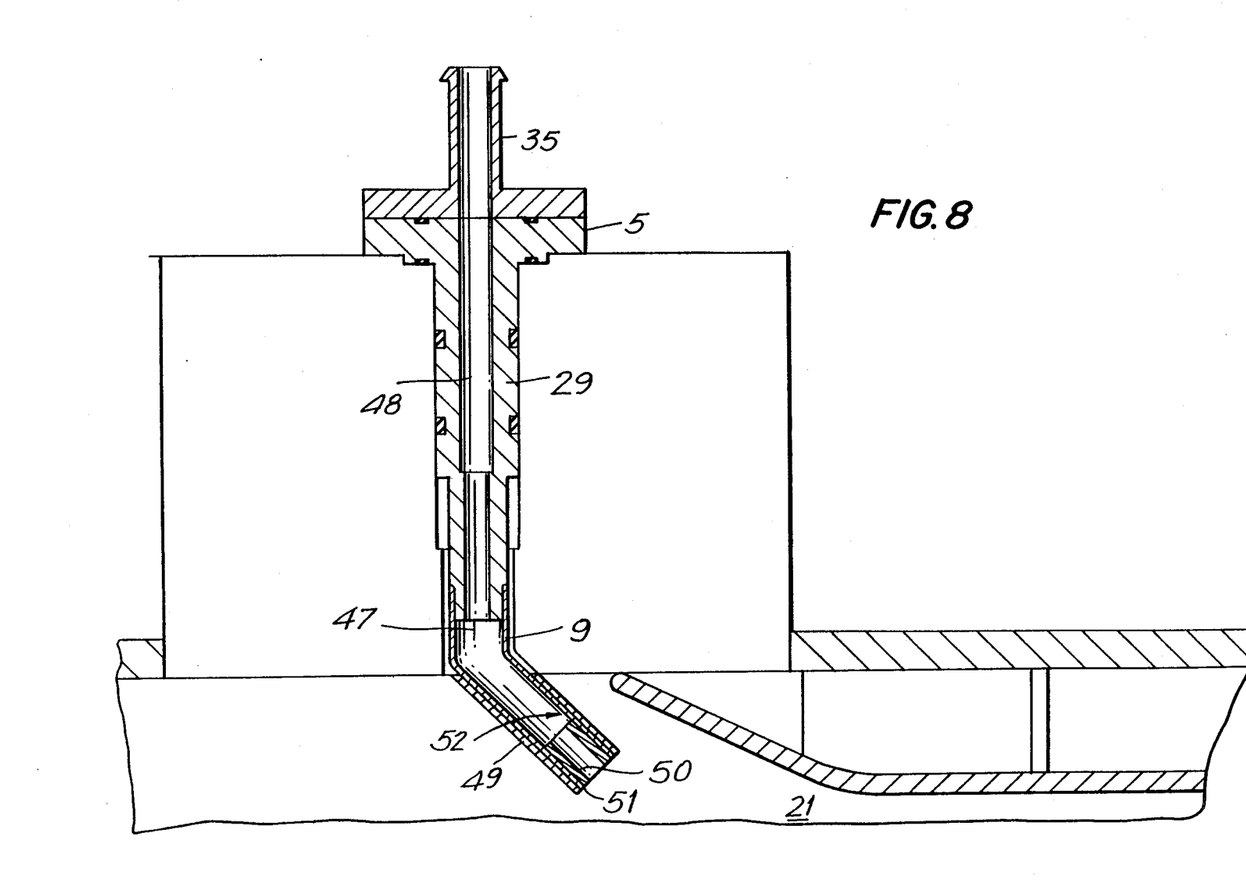
FIG. 8 is a sectional side view of an anode of the laser head shown in FIG. 7.

Referring now to FIGS. 7 and 8, there is shown a laser head which is a modified form of the head shown in FIGS. 3 to 6. In FIGS. 7 and 8, parts corresponding to those shown in FIGS. 3 to 6 are designated by the same reference numerals.

The laser head 20 shown in FIG. 7 has a chamber 25 defining a laser cavity 21 of circular cross-section, a front mirror/window 3, a rear mirror 4 and an electric discharge arrangement comprising four anode members 5 at one end of the cavity and six cathode members 6 at the other end of the cavity. There are no additional gas inlets. The anode members are spaced at 90° intervals around the cavity and the cathode members at 60° intervals. Each of the anode and cathode members are connected through a respective ballasting impedance (not shown) to a power supply (not shown in FIGS. 1 and 2) so that stable condensing electric discharges may be generated between the anode and cathode members as disclosed in more detail in British Patent Application No. 2095490A or British Patent No. 2095491, the disclosures of which are incorporated herein by reference.

As will be described in more detail below, the anode members 5 each include a gas passage 47 through which gas is able to flow into the cavity and a gas outlet 23 is provided beyond the cathode members 6.

The structures of the four anode members 5 are all identical and are most clearly shown in FIG. 8. Each anode member 5 is made principally from a length of copper tubing 9 of circular cross-section which is bent towards one end and at the other end is fixed to a brass component 29 of circular cross-section having an axial passageway 48 therethrough. The exterior of the tubing 9 is covered with electrically insulating material 49 heat shrunk on the tubing. A sleeve 50 of electrically insulating material is fitted inside the free end of the tubing 9 and a shoulder 51 formed on the sleeve 50 abuts the end of the tubing 9. Thus both the interior of the tip of the tubing and the exterior of the tubing is electrically insulated. As a result the only surface of the anode member available to provide an electrode surface for the root of the discharge is the surface 52 provided by the interior of the tubing upstream of the sleeve 50. It will be noted that immediately downstream of the surface 52 the gas flow passage is stepped inwardly, the step being defined by the inner end of the sleeve 50.

The anode members 5 are equiangularly spaced around the cavity 21 with the bent portions of the anode members inclined to the axis of the cavity and with the tips of the anode members lying in a common plane perpendicular to the axis of the cavity.

The cathode members may be of conventional construction.

The diameter of the optical path of the laser corresponds to the diameter of the laser cavity 21 along its central region between the mirrors 3, 4 and the whole of the cross-sectional area of the cavity is employed. The anode members 5 and cathode members 6, while they project into the chamber, do not intrude into the laser cavity 21 and the optical path between the mirrors 3, 4, since the diameter of the chamber is enlarged in the region of the anode members 5 and cathode members 6. The tips of the anode members 5 are inclined to the longitudinal axis of the laser so that discharges extend inwardly from the anode members and therefore reach the central axis of the cavity at a position close to the anodes so that the laser gain on the central axis is maintained for a greater part of the length of the laser cavity and there is only a small conical volume of short axial length extending from the anode members where the gain is significantly reduced.

The gas outlet 23 is provided on the opposite side of the cathode members 6 to the anode members 5 and is an annular outlet around the whole of the cavity 2. The annular outlet is defined by a manifold 28 which has an outlet 31 for connection to a gas recirculating system as has been described more fully with reference to FIG. 6.

The laser head of FIGS. 7 and 8 may be connected to other parts of the laser in the same manner as the laser head of FIGS. 3 to 5.

In operation, electric glow discharges are generated between the anode and cathode members 5, 6 and gas is injected into the laser cavity 21 through each of the anode members 5, and removed from the laser cavity through the outlet 23. Each discharge from an anode member 5 begins from the surface 52 inside the tubing 9 and upstream of the sleeve 50 so that the very first part of the discharge is confined within the tubing 9 along which there is a substantial gas flow.

In one particular example of the embodiment of FIGS. 7 and 8 using four anode members and six cathode members the diameter of the central part of the laser cavity 21 was 93 mm, the diameter of the laser beam (prior to any focussing) was 80 mm, the diameter of the enlarged portions of the chamber was 136 mm, the external diameter of the tubing 9 was 28 mm, the wall thickness of the tubing was 1 mm, the internal diameter of the sleeve 50, which was made of pyrophyllite, was 19 mm and the length of the sleeve was 20 mm. The cathode members were solid copper cathodes each with a surface area of 2600 $mm^2$. The spacing of the anodes from the cathodes was 0.63 m.

In operation with a stabilizing impedance of 10 kΩ connected to each cathode and a stabilizing impedance of 30 kΩ connected to each anode and with a discharge voltage of 14 kV, a total discharge current of 1.6 A was obtained giving a total discharge power of 22.4 kW. A gas mixture comprising, by volume, 82% He, 13.5% $N_2$ and 4.5% $CO_2$ was injected through the anode members 5. The total mass flow rate through the anode members 5 was 0.03 kg/s. The pressure in the laser cavity was maintained at 6 kPa and the pressure upstream of the anode members 5 was 28 kPa. With such an arrangement a power output of 5 kW was obtained. Thus the specific laser output was 1168 W/liter of discharge volume, the output power per meter of discharge was 8.3 kW/m and the efficiency of the laser was about 22 percent.

In the embodiment of FIGS. 7 and 8, a discharge from an anode member is compelled to emanate from a surface inside a gas flow passage much narrower than the laser cavity. Consequently the effect of the gas flow is focussed on the discharge along this first portion of the discharge and both the gas flow and the discharge are confined to a restricted cross-sectional area.

The reasons why the embodiments described above have such an increased power output is not fully understood but is believed to be because (1) the arrangements inhibit the transition of a glow discharge (which is desired for a laser) to an arc discharge and also (2) provide a more uniform distribution of excited species throughout the laser cavity.

It is believed that glow to arc transition of a discharge (an undesirable transition in a high power gas laser) between electrodes is dependent upon both factors relating to the electrodes and the region immediately surrounding them (electrode phenomena) and factors relating to the body of gas between the electrodes through which the discharge passes (column phenomena). In general, but not always, if a glow to arc transition occurs in any part of a discharge then the whole discharge will rapidly take on the characteristics of an arc. If the velocity of the gas through the active region is sufficiently high the arc instabilities will be swept away before a stable arc is developed. The embodiments described above provide particularly favourable conditions in the region immediately surrounding the anodes.

While in the embodiment described above a plurality of anodes and cathodes are provided and this is believed to be advantageous in a high power gas laser as it also assists in preventing glow to arc transition, it is within the scope of the invention to have a single anode and cathode.

In the embodiments described the gas is recirculated. It is however within the scope of the invention to have a system in which extracted gas is not recirculated or even to have a system in which gas is injected but not extracted. Such a system can of course only operate for a limited period of time but that time may be sufficiently long for certain applications and can be increased by increasing the volume of the inactive part of the chamber in which the laser cavity is defined or by providing an auxiliary chamber in fluid communication with the chamber defining the laser cavity. Also, of course, the laser may be used in a low pressure enviroment which may even be at a lower pressure than the pressure in the chamber.

What is claimed is:

1. A gas laser including
   a laser cavity,
   mirror means defining an optical path in the cavity,
   electrodes defining an electric discharge path in the cavity, the electrodes including at least one tubular anode member having a passage therethrough which at one end opens into the cavity,
   gas supply means for injecting gas into the cavity through the passage,
   an electrically conducting anode surface provided across the passage and recessed within said tubular member, the surface being perforated to allow gas to pass therethrough, and
   insulating means surrounding the electrically conducting anode surface to prevent travel of a root of the discharge away from the anode surface means.

2. A gas laser according to claim 1 further comprising a plurality of tubular anode members.

3. A gas laser according to claim 2 in which said one end of each of said passages in the anode members is arranged to lie in a common plane perpendicular to the optical path in the laser cavity.

4. A gas laser according to claim 1 in which the optical path in the laser cavity is substantially aligned with the electric discharge path defined by the electrodes.

5. A method of operating a gas laser including a laser cavity, mirror means defining an optical path in the cavity, and electrodes defining an electric discharge path in the cavity, the electrodes including at least one tubular anode member having a passage therethrough which at one end opens into the cavity and an electrically conducting perforated anode surface provided across the passage, the method comprising the steps of positioning the electrically conducting surface at a location recessed within the tubular anode member, injecting a gas into the cavity through the perforated anode surface in the passage and generating a discharge which extends from the electrically conducting anode surface in the interior of the passage.

6. A gas laser according to claim 5 in which the optical path in the laser cavity is substantially aligned with the electric discharge path defined by the electrodes.

7. A gas laser according to claim 6 in which the laser is a $CO_2$ gas laser.

8. A gas laser including
an elongate laser cavity,
mirror means defining an optical path along the cavity,
a set of cathodes at one end of the cavity,
a set of anodes at the other end of the cavity comprising a plurality of anode members each having a passage therethrough, one end of the passage opening into the cavity, an electrically conducting anode surface to prevent travel of a root of a discharge being provided on the interior of the passage and insulating means at said one end of the passage on the interior of the passage and around the exterior of the end of the passage to prevent travel of the root of the discharge to the end of the passage,
gas supply means for injecting gas into the cavity through the passages, and
gas extraction means for removing gas from the cavity at said one end of the cavity.

9. A gas laser including a laser cavity, mirror means defining an optical path in the cavity, electrodes defining an electric discharge path in the cavity, the electrodes including at least one anode member having a passage therethrough which at one end opens into the cavity, and gas supply means for injecting gas into the cavity through the passage, wherein a wall of the passage at said one end of the exterior of the anode member around the end of said passage is electrically insulated and an electrically conducting anode surface defining the root of the discharge recessed inwardly of a perimeter of the open end of the passage is provided.

10. A gas laser according to claim 8 in which the electrically conducting anode surface is defined by the interior surface of the wall of the passage, the interior surface being upstream of the perimeter of the open end of the passage.

11. A gas laser according to claim 10 in which the anode member is of generally tubular form.

12. A gas laser according to claim 10 in which the electrically conducting anode surface extends in a direction generally aligned with flow of said gas.

13. A gas laser according to claim 12 in which the passage through the anode member narrows immediately downstream of the anode surface.

14. A gas laser according to claim 13 in which the narrowing of the passage is provided by a step in the passage.

15. A gas laser according to claim 9 in which a plurality of anode members are provided, each having a passage for the injection of gas into the cavity by the gas supply means.

16. A gas laser according to claim 15 in which said one end of each of said passages in the anode members is arranged to lie in a common plane perpendicular to the optical path in the laser activity.

17. A gas laser including a laser cavity and electrodes defining an electric discharge path in the cavity, the electrodes including one anode member having a passage therethrough which at least one end opens into the cavity, wherein gas is injected into the cavity through the passage and a discharge extends from an electrically conducting anode surface inwardly of the perimeter of the open end of the passage, said one end and the exterior of the anode member around the end of said passage being electrically insulated from the anode surface which is recessed inwardly.

* * * * *